(12) United States Patent
Dähler et al.

(10) Patent No.: US 6,229,228 B1
(45) Date of Patent: May 8, 2001

(54) HIGH-SPEED DISCONNECTOR USING SEMICONDUCTOR TECHNOLOGY

(75) Inventors: Peter Dähler, Remigen; Horst Grüning, Wettingen, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/272,392

(22) Filed: Mar. 19, 1999

(30) Foreign Application Priority Data

Mar. 20, 1998 (DE) ............................................... 198 12 341

(51) Int. Cl.[7] ........................................................ H02J 7/00
(52) U.S. Cl. ............................ 307/64; 307/85; 307/126
(58) Field of Search ................................. 307/64, 43, 70, 307/80, 85, 86, 116, 125, 126, 414, 415; 327/438, 447

(56) References Cited

U.S. PATENT DOCUMENTS

| | | | |
|---|---|---|---|
| 3,414,872 | * 12/1968 | Barron | 307/414 |
| 5,164,872 | 11/1992 | Howell. | |
| 5,210,685 | * 5/1993 | Rosa | 363/109 |
| 5,347,166 | * 9/1994 | Schauder | 307/113 |

FOREIGN PATENT DOCUMENTS 2 666 941    3/1992 (FR).

OTHER PUBLICATIONS

General Electric, SCR Manual Second Edition, p. 38, Jan. 1961.*
Abstract—FR 2666941 A.

* cited by examiner

*Primary Examiner*—Fritz Fleming
*Assistant Examiner*—Robert L DeBeradinis
(74) *Attorney, Agent, or Firm*—Burns, Doane, Swecker & Mathis, L.L.P.

(57) ABSTRACT

The invention specifies a disconnector for decoupling a load from a supplying AC power supply system. The disconnector comprises a transformer whose primary is connected into the AC power supply system. On the secondary side, a rectifier circuit is provided which has a turn-off thyristor connected to it. In normal operation, the turn-off thyristor is kept closed, so that the power supply system supplies the load. In the event of power supply system faults or interruptions, the turn-off thyristor is opened, which disconnects the power supply system from the load owing to the transformer impedance.

5 Claims, 2 Drawing Sheets

HIGH-SPEED DISCONNECTOR USING SEMICONDUCTOR TECHNOLOGY

BACKGROUND OF THE INVENTION

1. Field of the Invention

The invention relates to the field of power electronics. It is based on a high-speed disconnector using semiconductor technology, in accordance with the preamble to the first claim, particularly suitable for uninterruptible power supplies for a load supplied by an AC power supply system. A disconnector of this generic type is described in the French Patent Application FR 2 666 941 A1, for example.

2. Discussion of Background

Disconnectors of this generic type are used for decoupling the load from a supplying AC power supply system. They can be used, in particular, for uninterruptible power supplies. Uninterruptible power supplies have an auxiliary voltage source which can be coupled to the load by coupling means after the load has been disconnected from the AC power supply system. The auxiliary voltage source can, by way of example, comprise a battery, whose DC voltage is converted to an AC voltage by means of a converter, a diesel unit or a rotating system which utilizes the kinetic energy of a generator.

High-speed uninterruptible power supplies having reaction times in the millisecond range are generally used, in particular, for sensitive loads such as computer systems or electronic apparatuses in hospitals. This makes it possible to ensure that all types of transient disruptions and brief voltage dips can be bridged, so that the load always has access to an uninterrupted AC voltage. The power requirement of such loads does not normally exceed a few tens of kW. Devices having power transistors or IGBTs can therefore be used as disconnectors.

Nowadays, solutions using rotary converters are preferred for sensitive loads with a relatively high power requirement (e.g. 0.5–2 MW). In this case, the kinetic energy of a generator is used to support ms-duration dips. If the disruption lasts for a longer time, a further inertial mass is connected by means of a dynamic coupling. In addition, a diesel unit can be started up and connected, in order to cover minute-long disruptions as well. Such rotating systems have been prior art for years and have proved themselves in principle. However, on account of the complex mechanisms and the occasional need for continuous operation of the equipment, they require a high level of maintenance and have significant losses. Furthermore, a number of systems need to be connected in parallel for powers greater than 2 MW.

For economic and technical reasons, it has not been possible up to now to transfer known electronic circuits to high-power applications.

SUMMARY OF THE INVENTION

Accordingly, one object of the invention is to provide a novel high-speed disconnector which uses semiconductor technology, is suitable for very high powers, works reliably and with a minimum of maintenance, and can disconnect a load from the supplying AC power supply system in a matter of milliseconds. This object is achieved by the features of the independent claims.

The essence of the invention, therefore, is that the disconnector comprises a transformer whose primary is connected in series with the AC power supply system and which has a turn-off thyristor connected to its secondary, with an uncontrolled rectifier circuit connected in between. The turn-off thyristor is preferably hard-driven.

The auxiliary AC voltage preferably comprises a DC voltage source which is converted into an AC voltage by means of a converter. The power supply according to the invention is of particularly advantageous design in that the converter is likewise equipped with hard-driven turn-off thyristors.

Further advantageous embodiments can be found in the appropriate dependent claims.

The advantages of the invention can be seen, in particular, in that the electronic disconnector is also suitable for very high powers. It is sufficiently fast to cover brief voltage dips and transients. In addition, the use of hard-driven turn-off thyristors allows a reduction in circuit complexity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
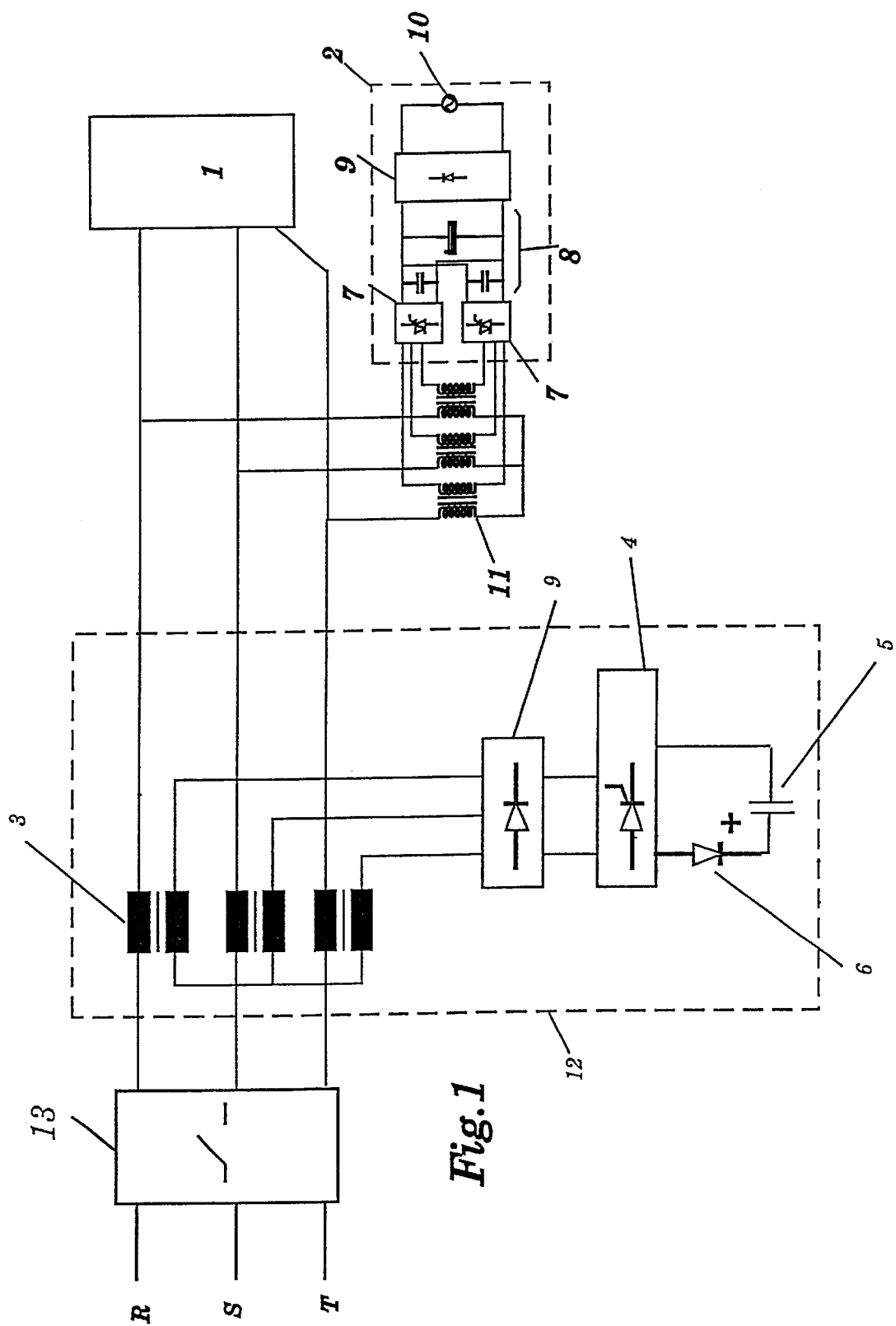
FIG. 1 shows a block diagram of a first embodiment of the invention.

Referring now to the drawings, wherein like reference symbols designate identical or corresponding parts throughout the several views, said reference symbols and their meaning being summarized in the list of designations, FIG. 1 shows an exemplary embodiment of the invention. R, S and T denote an AC power supply system connected to a load 1. The load is, in particular, sensitive high-power electrical equipment which has to be protected against disruptions in and failures of the AC power supply system. For this purpose, an auxiliary voltage source 2 is provided, which can be coupled to the load 1 if required. A three-phase transformer 11 can be provided for coupling. By way of example, the auxiliary voltage source 2 comprises an AC voltage source 10 which is converted into a DC voltage source by means of a rectifier 9 and intermediate circuit capacitors 8. The DC voltage is then converted into an AC voltage again by means of the converters 7, and is passed on to the load 1 via the transformer 11.

In order for it to be possible to decouple the load 1 from the AC power supply system (R, S, T), an electronic disconnector 12 is provided which must be capable of interrupting the flow of current between the power supply system and the load 1 reliably and quickly. According to the invention, the disconnector 12 comprises a transformer 3 which is connected into the power supply system R, S, T by its primary windings. On the secondary side, the voltage is rectified by means of a rectifier 9. To disconnect the power supply system from the load 1, a turn-off thyristor 4 is then provided which is connected to the outputs of the rectifier circuit 9. In normal operation, i.e. when the load 1 is supplied by the AC power supply system R, S, T, the switch 4 is kept turned on. This means that the secondary of the transformer 3 is short-circuited, and the primary connects the power supply system R, S, T to the load 1. In the event of power supply system faults or interruptions, the switch 4 is opened. The output of the rectifier circuit 9 becomes live, and the short circuit on the secondary of the transformer is eliminated. The load 1 is then disconnected from the power supply system owing to the no-load impedance of the transformer, and the auxiliary voltage source 2 can take over supplying the load 1. When the load 1 has been disconnected from the power supply system-R, S, T, the mechanical disconnector 13, which disconnects the power supply system completely, can be actuated.

In a preferred embodiment, the turn-off thyristor 4 is allocated a clamping circuit which has a diode 6 and a capacitor 5. The clamping circuit is used to transfer excess energy to the main circuit. This enables energy stored in power supply system inductors to be effectively dissipated, so that the disconnector 12 can be opened at any time, and especially even when overcurrents are flowing.

Figure 2:
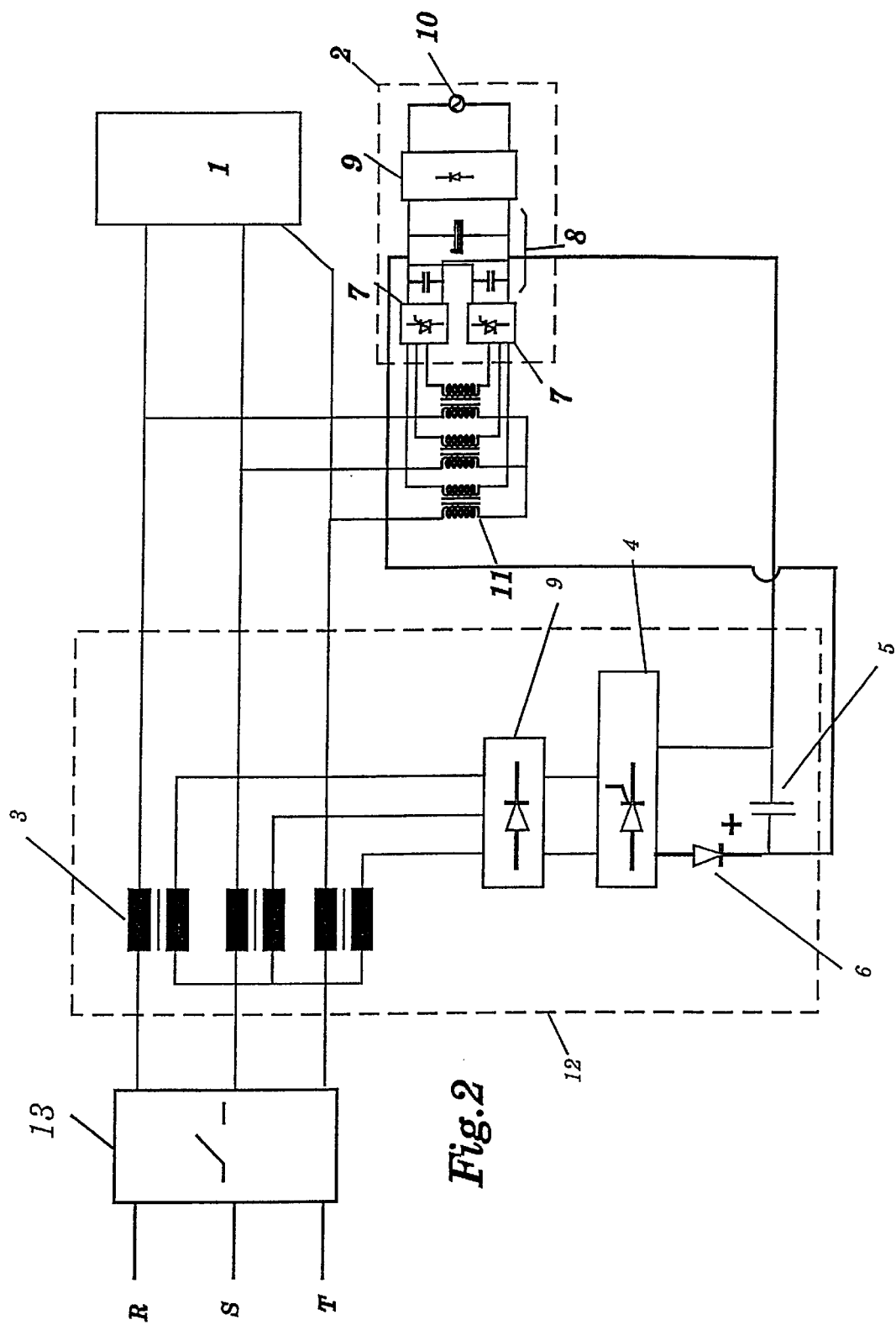
FIG. 2 shows a block diagram of a second embodiment of the invention.

According to the second exemplary embodiment, which is shown in FIG. 2, the clamping circuit is coupled in terms of potential to the DC voltage of the auxiliary voltage source. This means that the capacitance of the capacitor 5 can be chosen to be smaller, or the capacitor can be omitted completely, because the required capacitance is provided by the intermediate circuit 8 of the auxiliary source 2. It goes without saying that the turns ratio of the transformer 3 needs to be adapted in this case.

The invention naturally makes very great demands on the transformer 3. Said transformer 3 needs to be of superior design, because it has to carry the full load current when the turn-off thyristor 4 is turned on, and when the thyristor is turned off, it needs to be able to have voltage applied at any instant without saturation occurring. For this reason, it must be designed to handle roughly twice the voltage of conventional transformers.

The turn-off thyristor 4 is preferably hard-driven. This reduces the reaction time of the turn-off thyristors 4. Overall, the invention provides a disconnector or an uninterruptible power supply which is also suitable for very high-power sensitive loads. One advantage, in particular, is that the disconnector switches sufficiently quickly for it to be possible for the power supply system to be subsequently disconnected from the load "off load", using an additional mechanical switch 13.

Obviously, numerous modifications and variations of the present invention are possible in light of the above teachings. It is therefore to be understood that within the scope of the appended claims, the invention may be practiced otherwise than as specifically described herein.

What is claimed is:

1. A high-speed disconnector for disconnecting a load (1) from a supplying AC power supply system (R, S, T), wherein the disconnector (12) comprises a transformer (3) whose primary is connected to the AC power supply system (R, S, T) and which has a turn-off thyristor (4) connected to its secondary via a rectifier circuit (9).

2. The disconnector as claimed in claim 1, wherein a series circuit made up of a diode (6) and a capacitor (5) is connected in parallel with the turn-off thyristor (4).

3. The disconnector as claimed in claim 1, wherein the turn-off thyristor (4) is hard-driven.

4. An uninterruptible power supply for a load (1) supplied by an AC power supply system (R, S, T), comprising a disconnector (12) for decoupling the load (1) from the AC power supply system, an auxiliary AC voltage source (2) and means (11) for coupling the auxiliary AC voltage to the load, wherein the disconnector (12) comprises a transformer (3) whose primary is connected to the AC power supply system (R, S, T) and which has a turn-off thyristor (4) connected to its secondary via a rectifier circuit (9).

5. The uninterruptible power supply as claimed in claim 4, wherein the auxiliary AC voltage source (2) is coupled to the load (1) by means of a further transformer (11), and wherein the auxiliary AC voltage source (2) comprises a DC voltage source (8, 9) which is converted to an AC voltage by means of a converter (7), the converter (7) having hard-driven turn-off thyristors.

* * * * *